July 13, 1937.   O. J. SUNDSTRAND   2,086,749
BOOKKEEPING MACHINE
Filed Sept. 25, 1934   2 Sheets-Sheet 2
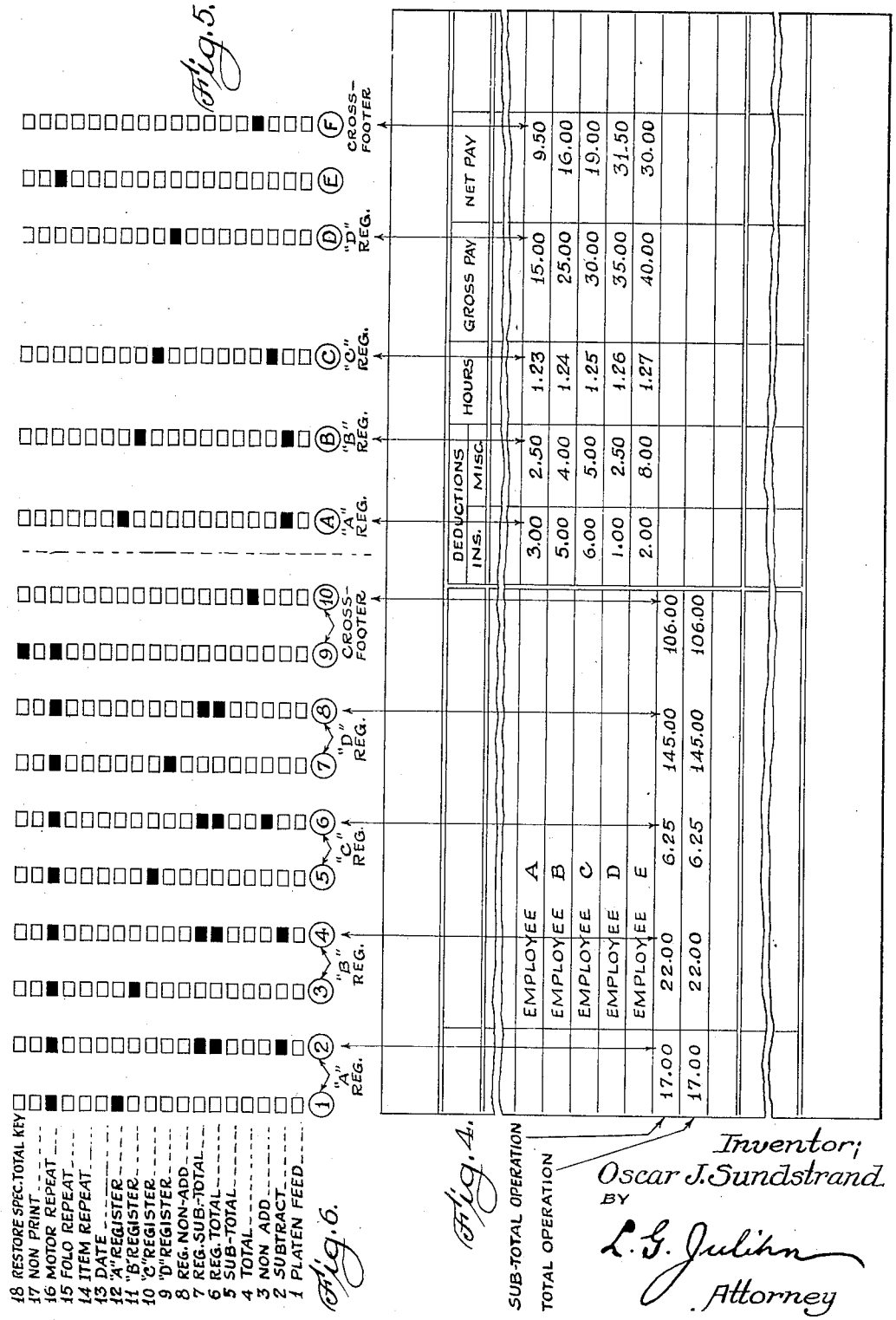

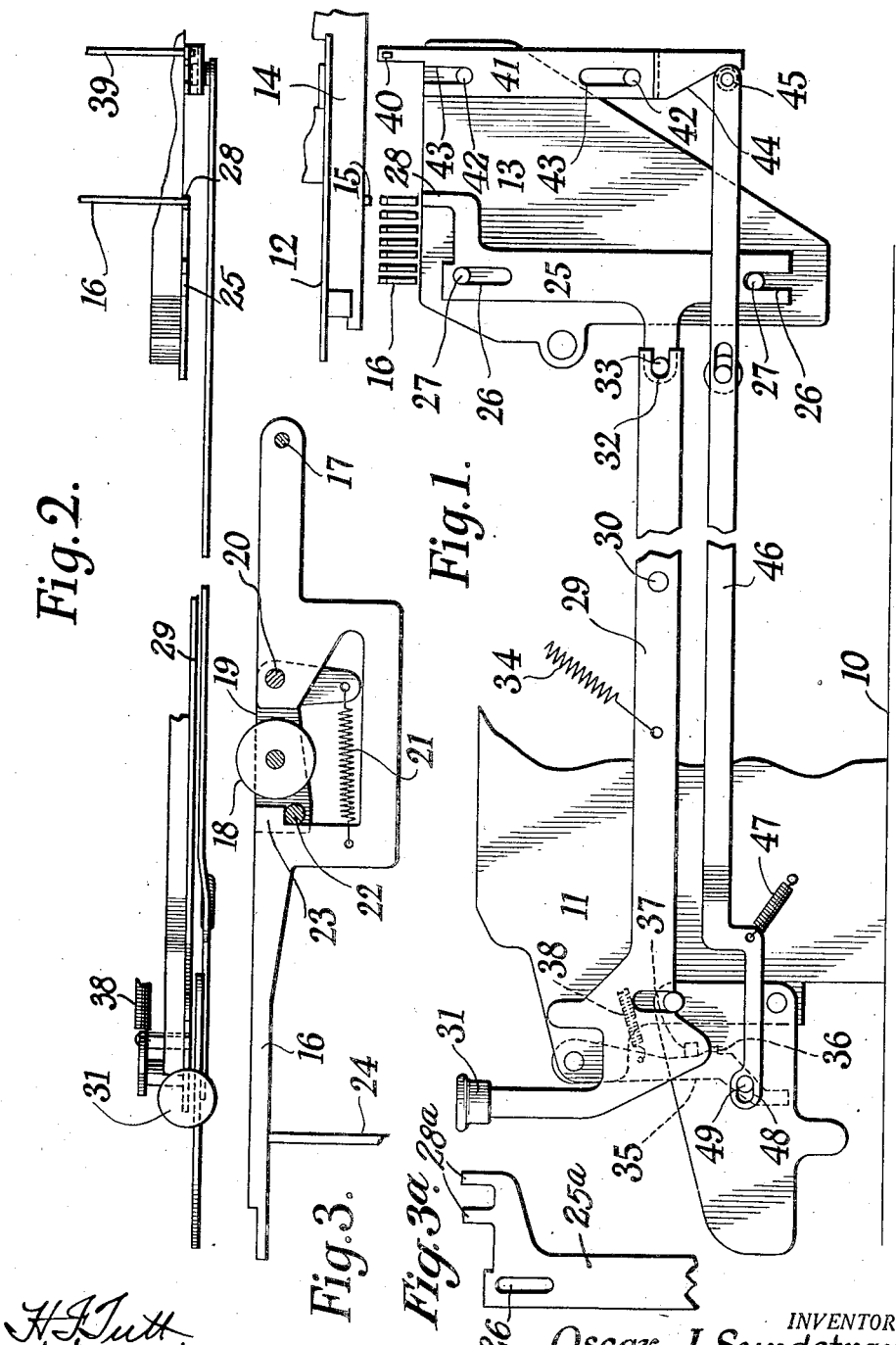

Patented July 13, 1937

2,086,749

UNITED STATES PATENT OFFICE 2,086,749

BOOKKEEPING MACHINE

Oscar J. Sundstrand, Bridgeport, Conn., assignor to Underwood Elliott Fisher Company, New York, N. Y., a corporation of Delaware Application September 25, 1934, Serial No. 745,401

4 Claims. (Cl. 235—60)

The invention relates to accounting, or bookkeeping machines, and more particularly to the control of machine functions thereof.

It is common practice to utilize the movement of the cross tabulating paper carriage of accounting, or bookkeeping machines, to automatically condition a desired totalizer, or totalizers for operation, or to automatically effect other machine functions, in predetermined columnar positions of the carriage.

Machines adapted to function in the above manner are illustrated and described in my copending applications, Serial Nos. 118,628 filed June 26, 1926, and 581,800 filed December 18, 1931, as well as in my Patent No. 1,946,823 which issued February 13, 1934, from an application filed April 17, 1929.

It will be understood, that prior to commencing a series of operations, the cross tabulating carriage of the machine is equipt with rollers, pins, or stop lugs, which in turn are arranged to co-act with parts associated with the several mechanisms of the machine, e. g., the totalizers or registers, to condition the same for operation as an incident to contact of a pin, or stop lug, on the carriage, with one of the machine parts.

One form of mechanism effective to accomplish this purpose is illustrated in my beforementioned Patent No. 1,946,823, in which a stop plate 322 (Fig. 1) is pivoted on an axis 323, supported by the side walls of the carriage 2.

The under surface of the stop plate 322, is provided with a plurality of pins 321, arranged in parallel paths, so as to travel in the respective planes of a nest of slides, similar to the slide 319, and operatively supported in the machine frame. It will be understood that a pin is positioned on the stop plate in each columnar position of the carriage corresponding to positions at which a machine function is to be automatically performed, and that each one of the slides on the machine frame is operatively associated with the mechanism employed to control a particular one of the several machine functions.

It will additionally be understood, that abutting engagement of any pin, with its co-acting machine slide, functions to occasion the desired automatic operation when the machine is caused to cycle, which in turn is effected by pulling the acutating handle in the case of a manually-driven machine or by causing the motor to function in the case of a motor-driven machine. In the latter case, the motor may be caused to function by manually depressing a motor bar or by operating a motor-controlling element through engagement of a "Motor repeat" pin on the carriage with a coacting element on the machine frame.

One object of the present invention resides in the provision of a novel combination of automatic and manual means to jointly control bookkeeping machine functions, whereby the utility of the machine is greatly increased.

A further object of the invention is to provide manually positioned means, effective to disable carriage control of a predetermined sequence of machine functions.

A more specific object of the invention is to provide manually enabled means effective to change carriage control of automatic conditioning of a totalizer or totalizers, for a sub-totaling operation, to automatic conditioning of the same totalizer or totalizers, for a totaling operation.

Yet another object of the invention, resides in the provision, in a bookkeeping machine of the type described including a laterally movable carriage, a plurality of totalizers, and means arranged to be actuated in the movement of said carriage to automatically condition any one, or ones, of said totalizers for operation; of manual means effective to disable any one, or ones, of said last-mentioned conditioning means.

Still another object of the invention resides in the provision, in a machine of the above type, including a laterally movable carriage arranged to automatically control a plurality of related functions of the same machine part; of manual means effective to disable automatic control of one of the functions of said machine part, and automatic means to disable said manual means.

Other objects and advantages will become apparent from the following description, taken in connection with the accompanying drawings in which:

Figure 1 is a fragmentary right-hand side elevation of a bookkeeping machine embodying the features of my invention.

Figure 2 is a plan view of certain of the parts shown in Figure 1.

Figure 3 is an enlarged fragmentary view of a machine part hereinafter designated a selector.

Figure 3a illustrates a modified or alternative form of the slide 25.

Figure 4 illustrates one type of work sheet adapted to be produced by a machine embodying the present invention.

Figure 5 is a diagrammatic key to the carriage control elements utilized in the performance of the work sheet illustrated in Figure 4.

Figure 6 is a key to the machine parts, or selectors, arranged to cooperate with the carriage elements indicated in Figure 5.

The invention is herein shown, as embodied in a machine of the general character described in my application Serial No. 581,800 filed December 18, 1931, but it will be understood that the invention is not limited to machines of this particular type nor to machines of the Sundstrand class. Reference may be had to the beforementioned patents and applications for an understanding of features not fully illustrated or described herein. Application Serial No. 581,800 discloses five totalizers, namely, a cross-footer and four auxiliary registers, A, B, C, and D. The present invention is disclosed in connection with such a machine and the same terminology is applied to the totalizers.

The base of the machine is diagrammatically indicated at 10 and a vertical side wall is fragmentarily shown at 11.

The stop plate 12, fixed to a laterally movable carriage (not shown), and similar in all respects to the corresponding part 770 in Figure 50, of my application Serial No. 581,800, is adapted to travel in a horizontal plane in overlying relation with respect to a rear part of the machine proper, indicated at 13. It is contemplated that the carriage, in the present instance, as is the case in my application of reference, will be shiftable in step-by-step movements to effect columnar spacing.

The under surface of the plate 12, is provided with a series of detachable control elements 14, which correspond with the similar parts 771 of my above mentioned application.

Each control element is in the form of an elongated holder, adapted to contain one or more stops, or pins, arranged at desired points along the length of the control element. Each stop, or pin, consists of a block arranged to fit within the control element and a stop lug 15, adapted to project through any one of a series of openings in the bottom wall thereof. It will be seen that the stop lugs 15, of the various control elements 14, are arranged to move with the carriage in a plurality of parallel paths.

The section 13, of the machine frame, operatively supports a group of pivoted elements 16, termed selectors, one such selector occupying a position in the vertical plane of each position provided for a stop lug in the control elements 14.

Although not all essential to the disclosure of this invention, eighteen such selectors are indicated in the accompanying drawings, the first seventeen being identical in all respects with those fully illustrated and described in my beforementioned application Serial No. 581,800. It will, of course, be understood, that the seventeen selectors previously referred to may be articulated to the respective parts of the machine which they are arranged to control, in the same manner as is shown in that application.

For example, the selector nearest to the front of the machine, as is indicated in the "key", Figure 6, of the accompanying drawings, may be employed to enable the line spacing mechanism.

The second one can be utilized to condition the machine to effect subtraction in a crossfooter such as is disclosed in application Serial No. 581,800.

The third selector may condition the machine to effect non-addition in the crossfooter.

It is contemplated that the fourth selector may condition the machine for the taking of a final total from the crossfooter.

The fifth selector can be used to condition the machine for the taking of a sub-total from the crossfooter.

The sixth selector is effective to condition the machine for the taking of a final total from whichever rear, or auxiliary totalizer, is in use.

The seventh selector conditions the machine for the taking of a sub-total from whichever rear totalizer is in use.

The eighth selector conditions the machine to effect non-addition in whichever rear totalizer is in use.

The ninth selector conditions the machine to place a particular one, say the "D" rear totalizer in use.

The tenth conditions the machine to place the "C" totalizer in use.

The eleventh conditions the machine to place the "B" totalizer in use.

The twelfth selector conditions the machine to place the "A" totalizer in use.

The thirteenth selector effects automatic printing of the date.

The fourteenth selector occasions automatic repetition of an item.

The fifteenth controls automatic repeating of a folio.

The sixteenth selector accomplishes automatic cycling of the machine, as hereinbefore mentioned.

The seventeenth selector automatically effects non-printing.

The eighteenth selector is effective to restore to inoperative position, the manually actuated means hereinafter described, whereby predetermined ones of the selectors are disabled.

Referring to Figure 3, the selectors 16, constitute in effect, levers which are pivoted on the common axis 17 in the frame section 13. The free ends of the several selectors may be guided to swing in vertical planes by means such, for example, as a slotted plate or comb similar to the part 751 in my beforementioned application Serial No. 581,800. Each selector carries a member to be engaged by a stop lug on the control plate, which, in the present instance, consists of a roller 18, yieldably supported upon the selector by means of a bell crank 19, pivoted at 20, and held in normal relation to the selector by means of a spring 21. The normal position of roller 18, is defined by a pin 22 which contacts a stop 23 formed integrally with the body of the selector. Movement of a stop lug 15 into position above the roller 18 causes the selector to be depressed on its pivot 17, unless the selector is held against depression in which event the spring 21 yields to allow the roller 18 to be depressed by the stop lug. As is the case in my application of reference, the free ends of the several selectors overlie vertically disposed reciprocable push rods 24, which are operatively connected to the several elements of the machine which are to be controlled.

Manually conditioned means is provided to disable carriage control of machine functions. In the present embodiment of the invention such means is effective to disable the seventh, or register sub-total selector, but it will be understood that any other one, or combination, of selectors might similarly be disabled.

Referring to Figure 1, an irregularly shaped blank 25, is slidably mounted on the frame section 13, by means of slots 26, formed in the body of the blank, and headed studs 27, on the machine section 13. An upstanding lug 28, formed integrally with the slide 25, is movable into and out of the path of movement of the upper end of the register sub-total selector. In Figure 1 the lug 28 is shown in its lowermost position in which it is ineffective to prevent depression of the register sub-total selector.

A key lever 29, pivoted on the machine frame at 30, and provided with a key 31, is effective to elevate the slide 25 to position to block the register sub-total selector. To this end a pin and slot connection 32, 33 is provided between the rear end of the key lever and a forwardly extending arm on the blank 25. A spring 34, normally tends to maintain the key 31 in its elevated position, the blank 25 and its lug 28 thereby being yieldably held out of the path of the register sub-total selector.

It will be obvious that depression of the key 31 will function to elevate the lug 28, and that so long as the latter part remains in its upper position, those stop lugs on the carriage, which are in position to contact the roller of the register sub-total selector, will merely depress the roller of the selector against the action of its coiled spring, the selector itself being prevented from moving.

The key 31 is locked in depressed position, so as to maintain the lug 28 in blocking relation with respect to the register sub-total selector, by means of a latch 35, pivoted on the machine frame and formed with a notch 36 effective to engage a stud 37 on the key lever 29.

A coiled spring 38, tends to swing the latch 35 in a counterclockwise direction as viewed in Figure 1, to maintain the notch 36 in engagement with the stud 37.

Carriage controlled means is provided to automatically release the latch 35 in any predetermined columnar position of the carriage, thus permitting the blank 25 to be lowered to normal position under the influence of spring 34 to restore carriage control of the register sub-total selector. To this end, the eighteenth selector, designated 39, in Figure 2, is rendered effective to release the latch 35.

The free end of selector 39 projects loosely through an aperture 40 in the upper end of a blank 41, which is slidably mounted on the frame section 13, by means of pin and slot connections 42 and 43. The lower end of the blank 41 defines a cam 44, which acts upon a roller stud 45, mounted on the rear end of a slide 46 arranged for forward and rearward movement in the frame of the machine.

A coiled spring 47 tends to maintain the slide 46 in its rearward position with its roller 45 in contact with the cam 44 of slide 41.

The forward end of the slide 46 is formed with an elongated slot 48, adapted to receive a pin 49 fixed to the latch 35 adjacent its lower end. As shown in Figure 1, the pin 49 is normally in engagement with the rearward end of slot 48 but it will be apparent that the pin is free to move forwardly to permit latch 35 to engage stud 37 when the key 31 is depressed.

It will be apparent from Figures 1 and 2, that a stop lug, positioned in any one of the control elements 14, on the plate 12, and in the vertical plane of selector 39, will function to depress the latter, thus moving the slide 41 downwardly to cam the link 46 in a forward direction, thereby moving the notch 36 of the latch 35 out of engagement with the stud 37.

Figure 4 discloses one type of work adapted to be performed on a machine embodying the present invention, but it will be understood that many bookkeeping forms can be advantageously handled in a machine incorporating the novel structure of the present invention, with its resultant flexibility of control.

The work piece illustrated is a pay roll form by means of which the net pay of each of several employees is arrived at, by subtracting from the gross earned pay, the amount of any deductions chargeable against the individual employees. For example, employee "A" is entitled to gross pay in the amount of $15.00, but this amount is chargeable with deductions of $3.00 for insurance (Ins.) and $2.50 for miscellaneous (Misc.) items.

Employee "B" is entitled to a gross pay of $25.00 from which a total deduction of $9.00 is to be made.

Similarly, employees "C", "D" and "E" are credited with gross amounts of $30.00, $35.00 and $40.00 respectively, from which deductions of $11.00, $3.50 and $10.00 are to be made.

As previously indicated, in machines of the type illustrated in my application Serial No. 581,800, the separate classes of items, for example, insurance, miscellaneous, hours, etc., are separately stored or accumulated in independent registers. The machine of that application contains a main totalizer or cross-footer and four rear registers.

That portion of Fig. 5 to the right of the dotted line represents an arrangement of control elements, A, B, C, D, E, and F adapted for use in adding and subtracting the various items shown in Fig. 4, and printing the totals or "net pay".

Thus, the control element A on the carriage corresponding with the 6th (Ins.) columnar position, is arranged to cause automatic addition of items relating to insurance, in the "A" register, the same amounts being simultaneously subtracted in the crossfooter.

Items entered in the 7th columnar position, under the caption "Misc.", are added in the "B" register, and subtractively entered in the crossfooter.

Items appearing in the 8th columnar position, representing the total number of working hours creditable to any one employee, accumulated in a third, say the "C" register.

After tabulation of the carriage to the 9th columnar position of the work sheet, the amount of the gross pay of each particular employee is automatically stored in the "D" register and additively entered in the crossfooter.

The control element designated E in Fig. 5 produces a blank or spacing stroke in which the crossfooter is automatically conditioned for a totaling operation in the 10th and last columnar position, as a consequence of which the difference between the gross pay creditable to each employee, and the sum-total of the deductions against his account, is automatically printed under the caption "Net pay".

It will be understood that the crossfooter is cleared at the conclusion of each operation in which the net pay of any particular employee is printed, after which the paper carriage is returned to the insurance columnar position, in readiness for the recording and registering of the pay-roll items of another employee.

After the pay-roll items of a number of employees have been thus entered, it is usually desirable to take a subtotal of each class of items and a total of the "net pay", after which entries are made for other employes, following which subtotals of items and a total of net pay are again taken, and so on until eventually final totals are taken of all the items and the net pay.

When subtotals or final totals are to be taken, the paper carriage is pushed to the right to the first columnar position (which in Fig. 6 is denoted by the numerals 1—2 enclosed in circles). The control elements corresponding to the first five columnar positions of the carriage are provided with a stop pin in each of the positions occupied by black squares in Fig. 6. In the arrangement shown two separate control elements are employed in connection with the control of machine functions in each of the first five columnar positions of the carriage.

As will be obvious, each of the control elements identified with the first five columnar positions of the carriage is equipped with a stop lug in the 16th or "motor repeat" position. In addition, the first control element in the first columnar position (the one marked 1 in Fig. 6), contains a stop lug effective to select the "A" register for operation and the second control element of the first columnar position is provided with two stop lugs operable to effect subtraction in the crossfooter and to depress the "total" and "sub-total" selectors associated with the "A" register.

In the second columnar position, the control elements 3 and 4 are set to select the "B" register; to condition the crossfooter for subtraction; and to depress the "B" register "total" and "sub-total" selectors.

In the third columnar position, the control elements 5 and 6 are set to select the "C" register for operation; to effect "non-addition" in the cross-footer; and to depress the "C" register "total" and "sub-total" selectors.

In the fourth columnar position the control elements 7 and 8 are provided with pins effective to select the "D" register for operation; and to depress the "D" register "total" and "sub-total" selectors.

In the fifth columnar position the control element 9 is provided with a stop lug or pin operable to depress the 18th selector, to permit the key 31 to rise to normal position, thereby lowering the blank 25 and its lug 28 to ineffective position. The control element 10 in the fifth columnar position is provided with a stop lug operable to depress the "total" selector of the crossfooter.

Before considering the work performed by the above described setting of the control elements in the first five columnar positions of the work sheet, it will be well to recall that the mechanism of the machine disclosed in my beforementioned application Serial No. 581,800 is such that when the "total" and "sub-total" selectors identified with the auxiliary registers are simultaneously depressed, only the "sub-total" selector is effective.

Referring now to Figure 4, the upper horizontal row of figures in the first five columnar positions of the work sheet ($17.00; $22.00; $6.25; $145.00; $106.00) are recorded in the following manner:

The position corresponding to control element 1 is a spacing stroke position in which the machine is automatically cycled to select the A register for operation in the first columnar position (the one corresponding to control element 2).

When the carriage reaches its first columnar position the "A" register, containing the total of the "insurance" items ($17.00), is actuated in a "sub-totaling" operation, the same amount being simultaneously subtracted in the crossfooter, the usual printing mechanism acting to print, "$17.00."

The position corresponding to control element 3 is a spacing stroke position wherein the machine is automatically cycled to select the B register for use in the second columnar position (the one corresponding to control element 4).

In the second columnar position the "B" register is operated and the total amount of "miscellaneous" deductions, which is stored therein ($22.00), is recorded in a "sub-totaling" operation of that register, the same amount being simultaneously entered subtractively in the crossfooter.

Control element 5 defines a spacing stroke position wherein the machine is automatically cycled to select the C register for use in the third columnar position (the one corresponding to control element 6).

In the third columnar position of the carriage, the "C" register, containing the total amount of "hours" credited to all employees, is put through a sub-totaling operation and the same amount is non-added in the crossfooter.

Control element 7 defines a spacing stroke position in which the machine is automatically cycled to select the D register for use in the fourth columnar position (the one corresponding to control element 8).

In the fourth columnar position the "D" register, containing the total amount of the "gross pay" creditable to all employees, ($145.00), is put through a sub-totaling operation, and since the crossfooter is not disabled by the presence of a non-add pin, the same amount will be additively accumulated in that counter.

Control element 9 defines a spacing stroke position wherein the machine is automatically cycled to condition the crossfooter for a clearing operation in the fifth columnar position (the one defined by control element 10).

In the fifth columnar position the crossfooter alone, which now contains the difference between the total amount of all deductible items and the total amount of all "gross pay," is put through a totaling operation, as a result of which $106.00 is recorded in the fifth columnar position and the crossfooter is left in a cleared, that is zero condition.

It will be noted that in the spacing stroke position of the carriage defined by the control element 9, the stop pin represented by the black square in said position functions to depress the 18th selector, but since the key 31 is in its elevated or normal position the movement communicated through blank 41 and link 46 to latch 35 has no effect. (For the sake of simplicity, in explanation, we may assume that the entries for all employees have been made, and that it is desired to take grand totals of the various classes of items.)

Now as the carriage is returned again to the spacing stroke position preceding its first columnar position the operator depresses key 3 thus latching the blank 25 in its elevated position, with lug 28 in blocking relation with respect to the register sub-total selector, (No. 7 in the key Fig. 6). As the carriage effects its second traverse of the first five columnar positions, the second or lower horizontal row of figures ($17.00; $22.00; $6.25; $145.00; $106.00) are recorded in the following manner:

As previously explained, the positions defined by the control elements 1, 3, 5, and 7 are spacing stroke positions in which the machine is automatically cycled to select the desired register for operation in the succeeding columnar position.

In the first columnar position the "A" register will be conditioned for operation and a final total taken therefrom because the register sub-total selector will be disabled through the blocking action of lug 28, which has been elevated to a position underlying the free end of the register sub-total selector. Simultaneously with clearing of the "A" register in this operation, the crossfooter will be actuated to subtractively receive the same amount, that is $17.00.

In the second columnar position the "B" register will be conditioned for a final totaling operation and the crossfooter again conditioned for a subtracting engagement, thus leaving the "B" register clear.

In the third columnar position the "C" register will be conditioned for a final totaling or clearing operation and the pin in the third position on the control element will function to prevent the amount from being entered in the crossfooter.

In the fourth columnar position the "D" register will be conditioned for a final totaling operation, the same amount being additively entered in the crossfooter.

When the carriage reaches the fifth columnar position, on its second excursion from the first to the fifth columns, each of the auxiliary registers will have been cleared, that is each will be standing at zero, and the total amount of the net pay ($106.00) will be stored in the crossfooter. This amount must now be cleared from the crossfooter and the blank 28 restored to normal position in preparation for the beginning of a new work sheet. Thus in the fifth columnar position the crossfooter is conditioned for the taking of a final total and the 18th selector is depressed by its control pin on control element 9, thus releasing key 31 and permitting lug 28 to drop to the position shown in Figure 1 under the influence of spring 34.

Thus the manually positioned lug 28, by means of which automatic conditioning of the several auxiliary registers for sub-totaling operations is defeated, is automatically restored to inoperative position.

It will be obvious that the blank 25 may be provided with one, or a plurality of lugs similar to lug 28, for defeating automatic control of any particular one or combination of selectors and that any desired number of independent blanks with independent actuating means might be employed. Fig. 3a illustrates a blank 25ᵃ having two lugs 28ᵃ for disabling two selectors 16.

The utility of the means for automatically restoring the special total key 31 will be appreciated in view of the fact that after having taken subtotals from the auxiliary registers as illustrated at the left in Fig. 4, it may be and usually is desirable to make entries for other employees. If the operator were obliged to remember to restore the special total key 31, he might inadvertently omit to restore it, thus causing trouble when attempting to make further payroll entries. The provision of automatic means for restoring the special total key obviates the necessity of attention on the part of the operator to that matter and eliminates difficulties due to inadvertent failure to restore such key after taking subtotals.

I claim as my invention:

1. In a machine of the class described, including a laterally shiftable carriage adapted to be moved to effect columnar spacing, the combination of function-controlling mechanism, carriage-actuated means to condition said mechanism in a predetermined columnar position of the carriage, means to disable said first-mentioned means in said columnar position, and carriage-actuated means to disable said second-mentioned means at another position of the carriage.

2. In a machine of the class described, including a laterally shiftable carriage adapted to be moved to effect columnar spacing, the combination of function-controlling mechanism, carriage-actuated means to condition said mechanism in a predetermined columnar position of the carriage, means to disable said first-mentioned means in said columnar position, and means for automatically disabling said second-mentioned means at another position of the carriage.

3. In a machine of the class described, including a laterally shiftable carriage adapted to be moved in one direction to effect columnar spacing and in the opposite direction for return to starting position, the combination of function-controlling mechanism, carriage-actuated means to condition said mechanism in a predetermined columnar position of the carriage, means to disable said first-mentioned means in said columnar position, and carriage-actuated means to disable said second-mentioned means at a subsequent position of the carriage and prior to the return movement.

4. In a machine of the class described, including a laterally shiftable carriage adapted to be moved to effect columnar spacing, the combination of function-controlling mechanism, carriage-actuated means to condition said mechanism in a predetermined columnar position of the carriage, means to disable said first-mentioned means in said columnar position, and a second disabling means controlled by the carriage at another position thereof, to disable the first disabling means.

OSCAR J. SUNDSTRAND.